United States Patent Office 3,218,857
Patented Nov. 23, 1965

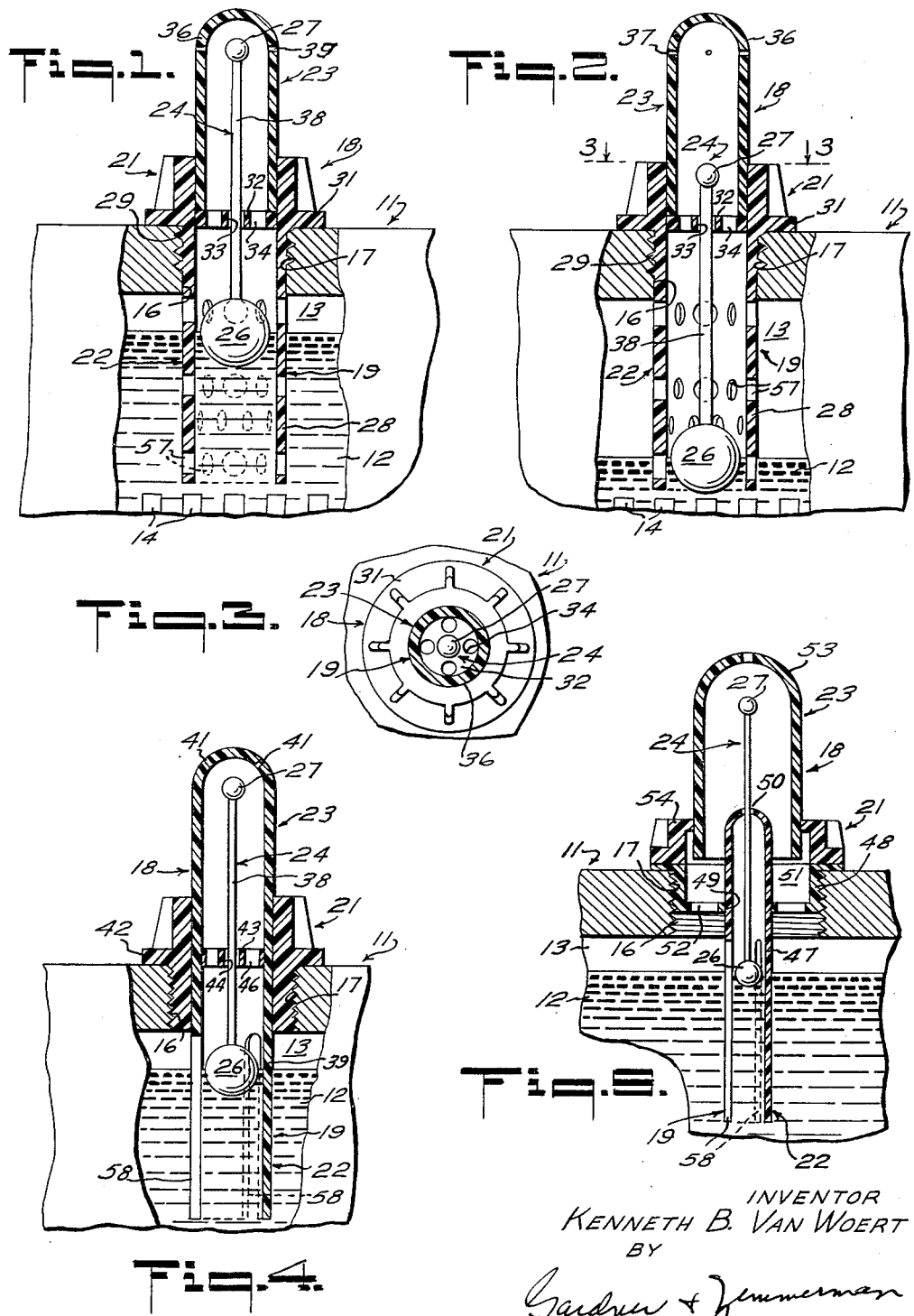

1

3,218,857
STORAGE BATTERY ELECTROLYTE
LEVEL INDICATOR
Kenneth B. Van Woert, 870 Coleman Ave.,
Menlo Park, Calif.
Filed Aug. 9, 1962, Ser. No. 215,920
4 Claims. (Cl. 73—306)

This invention relates to a combination liquid level indicator and vented filler plug for a storage battery case which functions to provide a visual indication of the electrolyte level in the cell closed by the plug, and is particularly directed to a device of this type characterized by its simplicity of design and ease of construction which result in the provision of a relatively low cost unit.

Various devices are known wherein a liquid level is incorporated in a filler plug for a storage battery case. These devices not only close the openings to the cells of a storage battery in the usual manner, but also provide a visual indication of the levels of electrolyte therein. Through employment of the plug devices, the electrolyte level in the respective cells of a battery can thus be ascertained without requirement of removal of the plugs.

Despite the apparent advantages which accrue from incorporation of devices of the foregoing character in storage batteries in place of the ordinary filler plugs thereof, their employment has not been widespread. In large part this may be due to the complexity and attendant relatively high cost of existing combination plug and level indicator devices over-balancing the practical advantages to be gained therefrom. Since a number of the plug devices need be employed with each storarge battery, the overall cost of outfitting same with level indicating plug devices is likely to be prohibitive unless the per unit cost thereof may be kept low.

It is therefore an object of the present invention to provide a combination filler plug and liquid level indicator device of the class described which is of a relatively simple easy to fabricate design whereby the devices may be produced at a relatively low per unit cost.

It is another object of the invention to provide a device of the class described which is extremely rugged and reliable in its operation as a liquid level indicator.

Still another object of the invention is the provision of a device of the class described wherein the level indicator includes an immersible tubular body and level indicating float means slidably disposed in the body which body is arranged to permit electrolyte to be freely admitted to and displaced from the body interior for reliable accurate actuation of the float means.

It is a further object of the invention to provide a device of the class described wherein the chances of the float means touching the side walls of the tube and being thereby impeded in its level indicating floatation are minimized.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is an elevation view with portions broken away of a combination filler plug and liquid level indicator device according to the present invention, the device being illustrated in association with one cell of a standard storage battery as indicating a full level of electrolyte therein.

FIGURE 2 is a view similar to FIGURE 1, but with the device indicating a low level of electrolyte in the cell.

2

FIGURE 3 is a sectional view taken at line 3—3 of FIGURE 2.

FIGURE 4 is an elevation view with portions broken away of a modified form of the device.

FIGURE 5 is a view similar to FIG. 4, but showing a further modified form of the device.

Referring now to the drawing, 11 indicates the casing of a storage battery of the type designed to accomodate a high level reserve supply of electrolyte 12 in each cell 13 above the plates 14 thereof. The top wall of each cell 13 in accordance with conventional practice, is formed with a filling opening 16 to facilitate periodic replenishment of electrolyte as needed to maintain it at a satisfactorily high level. The wall of opening 16 is threaded at its entrance, as indicated at 17, such that a filler plug may be screwed therein in the usual manner to close the opening. In instances where the sides of the opening are not threaded, as for example merely tapered, the plug of course will be correspondingly formed to provide for the desired closure seal. Commonly the plug must be removed in order that the level of electrolyte in the cell may be ascertained by direct visual observation. However, where each conventional plug is replaced with one of various combination plug and liquid level indicator devices, the electrolyte level in the corresponding cell may be observed without requirement of plug removal.

In accordance with the present invention there is provided a combination filler plug and liquid level indicator device 18 which, it is particularly important to note, is of a simple, easy to construct design. The resulting low per unit cost of this device facilitates installation thereof in storage batteries at an overall cost which is within reason. More particularly the device 18 simply comprises tubular housing means 19 associated with filler plug means 21 adapted to engage the threads 17 and mount the housing means in the filler opening 16. The housing means 19 includes a lower portion 22 which depends from the plug means a sufficient distance to be closely adjacent the plates 14 when mounted in the filler opening, and which is arranged to permit entry of the electrolyte thereinto. The housing means 19 also includes an upper cap portion 23 which projects upwardly from the plug means and is at least in part transparent to permit visual observation of its interior. A level indicating float member 24 is slidably mounted within the housing means, such member including a float 26 within the lower portion 22 of the housing means and an indicator 27 within the cap portion 23 thereof. Thus the electrolyte which has entered the lower portion of the housing means from the cell buoys the float in accordance with the electrolyte level therein. The indicator portion of the float member correspondingly assumes a visible vertical position within the cap portion commensurate with the electrolyte level. As the electrolyte level varies, the position of the indicator hence correspondingly varies to provide a visual indication of the electrolyte level in the cell.

Considering now the device of the present invention in greater detail as to several preferred structural embodiments thereof, the device may be advantageously provided as illustrated in FIGURES 1–3. In this case, the housing means 19 is of a two piece construction including an elongated tubular body 28 having an externally threaded portion 29 terminating in a flanged portion 31 at one end. The threaded portion 29 and flanged portion 31 are formed to be similar to a conventional battery filler plug and constitute the plug means 21 of previous mention. A partition 32 is provided across the interior bore of body 28 at a position inwardly spaced a short distance from its flanged end, preferably a position substantially adjacent the junction of the threaded portion 29 with the lower face of the flanged portion 31. The partition 32 thus defines the base of a recess in the flanged end portion of the body. The partition is provided with a central aperture 33 for purposes subsequently described, as well as apertures 34 which serves to vent the interior portions of the body underlying the partition to the recess. The body is preferably constructed of corrosion resistant material such as plastic.

A tubular cap piece 36, closed at one end and open at the other, is removably mounted with the open end disposed in the recess. Securance of the cap piece in position is advantageously facilitated by a press fit between the cap piece and walls of the recess. The cap piece is of a transparent material, such as lucite, to facilitate viewing of the interior thereof. In addition, vents 37 are provided in the cap piece to facilitate venting of the lower interior portions of the body 28 to atmosphere through apertures 34 and the cap piece vents.

The float member 24 is preferably provided with the float 26 in the form of a sphere or ball and the indicator 27 in the form of spheroidal bead. The float and indicator are connected by an elongated stem 38 having its opposite ends respectively diametrically secured thereto. The float is disposed in the lower portions of the body while the indicator is disposed in the cap piece 36, the stem extending through the partition aperture 33 in freely slidable relation thereto. As in the case of the body 28 the float member is advantageously fabricated from a corrosion resistant material, such as plastic.

With the body 28 mounted in the filler opening 16 of a cell by screwing the threaded portion 29 into the threads 17, the lower portion of the body extends downwardly into the cell to a position closely adjacent the plates 14. The electrolyte 12 enters the lower interior portions of the body and supports the float 26 at a vertical position corresponding to the level of the electrolyte. The indicator 27 at the other end of the float member assumes a corresponding vertical position within the transparent cap piece 36. If the indicator is in the upper portions of the cap piece, as depicted in FIGURE 1, a high electrolyte level is indicated. As the level drops, so does the float and indicator. When the indicator is in the lower portions of the cap piece, as indicated in FIGURE 2, the electrolyte level is low and addition of electrolyte to the cell is necessary. Replenishment of liquid in the cell may be effected by removal of the cap-piece 36 and pouring the liquid into the recess from whence it drops through the openings 34 into the cell. If desired of course the electrolyte or liquid may be introduced into the cell by unscrewing and removing the entire cap unit.

A modified form of the level indicating device is depicted in FIGURE 4. As illustrated therein, the housing means 19 comprises an elongated tubular body 39, which is closed at one end and open at the other. The body 39 is of a transparent corrosion resistant material, e.g., various plastics such as Lucite. The closed end of the body is provided with vents 41 which are analogous to the vents 37 of the previous embodiment. A collar 42 in the form of an apertured conventional filler plug is concentrically secured to the body of an intermediate position thereof. When the threaded portion of the filler plug collar is engaged with the filler opening threads 17, the open lower end of the body hence depends into the cell while the closed upper end of the body projects upward from the collar. A partition member 43 is secured within the body, as by means of a plastic adhesive, at a position adjacent the collar. The partition includes a central aperture 44 and vent apertures 46 and is thus analogous to partition 32 of the other embodiment. The float member 24 is preferably identical to that previously described and is disposed in the body 39 with the stem 38 freely traversing the aperture 44 and the float 26 and indicator 27 respectively in the lower and upper portions of the body. Operation of the present embodiment is similar to that previously described relative to the embodiment of FIGURES 1-3. If desired, the body 39 instead of being fixedly attached to the plug 42, may be frictionally slidably mounted therein. In this manner, in the event, such as due to the particular design of the battery, it is advisable to change the location of the operating area of the float, such change may be effected by simply raising or lowering the body in relation to the plug.

In FIGURE 5, a further modified form of the invention is illustrated. As here shown a tubular body 47 preferably of transparent material is slidably and frictionally fitted in a plug 48, the stem of the float member 24 being extended through an opening 50 in the closed upper end of the body 47. The body 47 extends through an opening 49 in a bottom portion of the plug 48 into a recess 51 formed in the plug, the latter portion being provided with openings 52 through which liquid may be fed into the battery in case it is desired not to remove the plug. It is to be noted that since the admission of liquid to the interior of the battery is outside of rather than through the body 47, and also the opening 50 is normally well above the electrolyte, there will be no chance of any accumulation in the opening to interfere with the free movement of the float. A cap 53 of transparent material is slidably and frictionally mounted in a cover portion 54 of plug 48, and as will be noted from the drawing, the cap is considerably larger in diameter than the body 47 and therefore when removed a relatively large inlet opening for introduction of liquid to the recess is afforded.

It will be appreciated that in both the embodiments of FIGURES 1-3, 4, and FIGURE 5, respectively, the open ends of the bodies 28 and 39 may be imperforate with entry of electrolyte being facilitated solely through the end openings. Such a construction may cause the electrolyte in the body to rise somewhat above the level of electrolyte in the cell by capillary action. The level difference may of course be readily compensated by suitable design of the float member. However, from the standpoint of simplicity of design it is more desirable that the level difference need not be considered. To this end the bodies 28 and 39 are preferably arranged to permit the free passage of electrolyte through their walls adjacent the end openings and thus greatly minimize, if not eliminate, the capillary effect. Free passage of electrolyte through the body walls may be variously accomplished. For example, the body may be provided with a plurality of distributed perforations 57 radially through the wall thereof in a region adjacent the end opening as illustrated in FIGURES 1 and 2. Alternatively, a number of slots or scallops 58 may be provided to extend longitudinally from the open end of the tube as illustrated in FIG. 4. In both instances, aside from the free passage of electrolyte facilitated, the chances of the float 26 touching the interior wall of the body are minimized, the wall openings reducing the wall surface area that can be contacted by the float.

What is claimed is:

1. A device of the character described comprising an elongated tubular transparent body closed at one end and open at the other, said body having at least one vent passage adjacent its closed end, an externally threaded plug member disposed concentrically about said body at a longitudinally intermediate position thereof, said body being selectively axially slidable relative to said plug member, a transverse partition within said body adjacent said plug member, said partition having a central aperture and at least one off-axis aperture therethrough, and a level indicating float member, said float member including a ball float disposed within said body on the open end side of said partition, an indicator bead disposed within said body on the closed end side of said partition, and an interconnecting stem extending through the central aperture of said partition in freely slidable relation thereto.

2. A device according to claim 1, further defined by said body having openings through the wall thereof adjacent its open end.

3. A filling and level indicating device for a battery or the like, comprising a closure plug for capping an opening to the interior of the battery housing, said plug having upper and lower plug portions with a space therebetween and each having an opening in communication with said space, said lower portion also having liquid inlet means between said space and the interior of said housing, a tubular member mounted in the opening in the lower plug portion and being selectively axially slidable therein, the lower portion of said member being open to the interior of the housing, a level indicating float member mounted in said tubular member and having a stem extending upwardly through an axial opening in the upper end of said tubular member, and a cap of transparent material removably mounted on the upper plug portion and closing the opening therein.

4. A filling and level indicating device in accordance with claim 3, in which the opening in the upper plug portion is larger than said inlet means in the lower portion, and the cap is in the form of a tubular member correspondingly transversely larger than the first tubular member and in which the upper portion of the first tubular member and of the stem is receivable.

References Cited by the Examiner
UNITED STATES PATENTS

| | | | |
|---|---|---|---|
| 1,061,874 | 5/1913 | Seeley | 73—322 X |
| 1,643,238 | 9/1927 | Curtis | 136—182.2 |
| 1,703,233 | 2/1929 | Hall et al. | 136—182.2 |
| 2,484,163 | 10/1949 | Gosheff | 73—306 |
| 2,562,604 | 7/1951 | Couchey | 73—306 |
| 3,080,753 | 3/1963 | Tickner et al. | 73—306 |

FOREIGN PATENTS 120,414  11/1918  Great Britain.

ISAAC LISANN, *Primary Examiner.*

JOHN H. MACK, *Examiner.*